US010986097B2

(12) United States Patent
Sloane et al.

(10) Patent No.: US 10,986,097 B2
(45) Date of Patent: Apr. 20, 2021

(54) SYSTEM FOR USING A DISTRIBUTED LEDGER TO MANAGE USER ENTITLEMENTS TO COMPUTING RESOURCES

(71) Applicant: Bank of America Corporation, Charlotte, NC (US)

(72) Inventors: Brandon Sloane, Santa Barbara, CA (US); Brian Diederich, Simi Valley, CA (US); John Howard Kling, Cincinnati, OH (US)

(73) Assignee: Bank of America Corporation, Charlotte, NC (US)

( * ) Notice: Subject to any disclaimer, the term of this patent is extended or adjusted under 35 U.S.C. 154(b) by 283 days.

(21) Appl. No.: 15/966,982

(22) Filed: Apr. 30, 2018

(65) Prior Publication Data

US 2019/0334912 A1    Oct. 31, 2019

(51) Int. Cl.
| | |
|---|---|
| *H04L 29/06* | (2006.01) |
| *G06F 21/60* | (2013.01) |
| *G06F 21/62* | (2013.01) |
| *H04L 9/32* | (2006.01) |
| *H04L 9/06* | (2006.01) |
| *G06F 16/23* | (2019.01) |

(52) U.S. Cl.
CPC ............ *H04L 63/102* (2013.01); *G06F 16/23* (2019.01); *G06F 21/604* (2013.01); *G06F 21/6218* (2013.01); *H04L 9/0637* (2013.01); *H04L 9/0643* (2013.01); *H04L 9/3247* (2013.01); *H04L 63/12* (2013.01)

(58) Field of Classification Search
CPC ... H04L 63/102; H04L 9/0637; H04L 9/3247; H04L 2209/38
See application file for complete search history.

(56) References Cited

U.S. PATENT DOCUMENTS

| | | | |
|---|---|---|---|
| 7,308,704 B2 | 12/2007 | Vogel et al. | |
| 7,451,477 B2 | 11/2008 | Griffin et al. | |
| 8,132,231 B2 | 3/2012 | Amies et al. | |
| 8,196,184 B2 | 6/2012 | Amirov et al. | |
| 8,225,416 B2 | 7/2012 | Richards et al. | |
| 8,341,242 B2 | 12/2012 | Dillon et al. | |

(Continued)

*Primary Examiner* — Dao Q Ho
(74) *Attorney, Agent, or Firm* — Michael A. Springs; Moore & Van Allen PLLC; Peter B. Stewart (57) ABSTRACT

An access control system may include one or more computer processors; a memory, wherein the memory comprises an entitlement database of a resource access manager; a network communication device; and an access control module stored in the memory, executable by the one or more computer processors. The access control module may be configured to: perform the steps of: receiving a request to add one or more entitlement data records to a distributed electronic ledger; validating the one or more entitlement data records; appending the one or more entitlement data records to the distributed electronic ledger; and verifying a first entitlement data record stored in the entitlement database by comparing the first entitlement data record with a first corresponding entitlement data record stored in the distributed electronic ledger, wherein the first entitlement data record and first corresponding entitlement data record are both associated with a first user.

13 Claims, 7 Drawing Sheets

(56) References Cited

U.S. PATENT DOCUMENTS

| | | |
|---|---|---|
| 8,490,152 B2 | 7/2013 | Staiman et al. |
| 8,763,069 B2 | 6/2014 | Renfro et al. |
| 9,189,644 B2 | 11/2015 | Kling et al. |
| 9,286,595 B2 | 3/2016 | Taneja et al. |
| 9,330,280 B2 | 5/2016 | Rachalwar et al. |
| 9,483,488 B2 | 11/2016 | Kling et al. |
| 9,491,116 B2 | 11/2016 | Pugh |
| 9,495,380 B2 | 11/2016 | Kling et al. |
| 9,558,334 B2 | 1/2017 | Kling et al. |
| 9,584,525 B2 | 2/2017 | Baikalov et al. |
| 9,602,517 B2 | 3/2017 | Connor et al. |
| 9,684,793 B2 | 6/2017 | Schlesinger et al. |
| 9,785,760 B2 | 10/2017 | Biswas et al. |
| 2009/0043596 A1 | 2/2009 | Pierce |
| 2013/0103640 A1 | 4/2013 | Rehman |
| 2014/0331252 A1 | 11/2014 | Jin et al. |
| 2015/0120539 A1* | 4/2015 | Amancherla ...... G06Q 20/3676 705/41 |
| 2018/0248880 A1* | 8/2018 | Sardesai ............... H04L 63/101 |

* cited by examiner

SYSTEM FOR USING A DISTRIBUTED LEDGER TO MANAGE USER ENTITLEMENTS TO COMPUTING RESOURCES

FIELD OF THE INVENTION

The present invention relates to an access control system that may be used to manage user entitlements to computing resources. The access control system may be configured to perform the steps of receiving a request to add one or more entitlement data records to a distributed electronic ledger; validating the one or more entitlement data records; appending the one or more entitlement data records to the distributed electronic ledger; and verifying a first entitlement data record stored in an entitlement database by comparing the first entitlement data record with a first corresponding entitlement data record stored in the distributed electronic ledger, wherein the first entitlement data record and first corresponding entitlement data record are both associated with a first user.

BACKGROUND

As the use, size, and importance of electronic information systems has increased, it has become more difficult to manage the entitlements provided to users of such systems. Accordingly, a need exists for an improved way of managing user entitlements.

SUMMARY

In one aspect, the present invention embraces an access control system, and an associated method and computer program product, for managing user entitlements to computing resources. The system typically includes a computer processor, a memory, and a network communication device. An entitlement database is typically stored in the memory. The system also typically includes an access control module stored in the memory and executable by the processor. In one embodiment, the access control module is configured to perform the following steps: receiving a request to add one or more entitlement data records to a distributed electronic ledger; validating the one or more entitlement data records; appending the one or more entitlement data records to the distributed electronic ledger; and verifying a first entitlement data record stored in the entitlement database by comparing the first entitlement data record with a first corresponding entitlement data record stored in the distributed electronic ledger, wherein the first entitlement data record and first corresponding entitlement data record are both associated with a first user.

In a particular embodiment, verifying the first corresponding entitlement data record comprises: identifying a discrepancy between the first entitlement data record and the first corresponding entitlement data record; and in response to identifying the discrepancy between the first entitlement data record and the first corresponding entitlement data record, performing an information security action to remediate the discrepancy. The information security action may comprise suspending, modifying, or removing one or more entitlements of the first user. The information security action may comprise updating the entitlement database to eliminate the discrepancy.

In another particular embodiment, the first corresponding entitlement data record comprises a first hash value computed using a hash function; and verifying the first corresponding entitlement data record comprises: calculating, using the hash function, a second hash value based on the first entitlement data record; and comparing the first hash value and the second hash value.

In another particular embodiment, verifying the first corresponding entitlement data record comprises: identifying a discrepancy between the first hash value and the second hash value; and in response to identifying the discrepancy between the first hash value and the second hash value, performing an information security action to remediate the discrepancy.

In another particular embodiment, the first corresponding entitlement data record stored in the distributed electronic ledger comprises encrypted data; and verifying the first corresponding entitlement data record comprises: decrypting the encrypted data; and comparing the decrypted data with data from the first entitlement data record.

In another particular embodiment, the one or more entitlement data records are appended to the distributed electronic ledger in response to validating the one or more entitlement data records.

In another particular embodiment, the one or more entitlement data records comprise one or more digital signatures; and validating the one or more entitlement data records comprises validating the one or more digital signatures.

In another particular embodiment, the distributed electronic ledger is a blockchain.

In another particular embodiment, the one or more entitlement data records are associated with provisioning and/or de-provisioning one or more entitlements; and the access control system is a resource access manager.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

"Computing resources" are the hardware and software components that make up information systems. "Applications," "interfaces," "networks," and "devices" are types of computing resources. A "device" is typically any type of electronic device within an information system, such as workstations, personal computers, tablets, smartphones, servers, telephones, storage devices, network, devices, and the like. "Applications" is typically an integrated set of computer programs that is used to achieve one or more related technical or entity objectives and typically refer to the software, interactions, and applications flows on the devices. "Networks" are typically the connections and traffics flowing among the devices and applications.

An "application component" is typically a sequential file containing executable program code. An application is composed of application components. An application component is typically composed of: (i) a set one or more capabilities and (ii) application component rules that supply the sequential and conditional logic for implementing the capabilities. Application component methods are types of application component rules. An "application component method" is the implementation of an operation of an application component. It specifies the algorithm or procedure that produces the results of an operation of an application component. An application component method is typically specified as a procedural expression, a linguistic string in a designated language (e.g. C++) that describes an algorithm.

A "resource manager" is a type of application that coordinates and integrates the interaction of computing resources at run-time. The capabilities needed to perform this function will vary depending on the nature of the computing resources being managed. An operating system a type computing resource manager. Most operating systems have a set of common capabilities such as memory management, process management and storage management, the exact nature of these will vary depending on the nature the device. Not all resource managers are operating systems. An application may function as a resource managers under the control of an operating system.

A "resource access manager" is an application that is responsible for controlling access to its computing resources and data objects. A resource access manager may be a component of a resource manager itself or it may be a separate application to which access control authority has been delegated by the resource manager. For example, a zOS mainframe can natively control access to its resources or use an external resource access manager, such as Resource Access Control Facility (RACF) or CA Top Secret, to manage access control.

An "interface" exposes applications to human and application users via a human user interface (e.g., a graphical user interface) and/or an application programming interface (API). In this regard, an interface defines a facade that provides access to the capabilities that that are implemented by application components behind the facade.

A "capability" is an abstraction of an aptitude or a competency that contributes to an outcome. These outcomes relate to both entity and technical activities. A capability can be composed of other capabilities. This allows a capability's functional scope to range from very broad to very granular.

An "entity" may be any person or organization implementing a vertically integrated access control system in an information system described herein.

An "entity capability" refers to an aptitude or competency that an entity may possess or require at an entity, business function, or individual level that has the potential, or is required to contribute to a business outcome thereby creating value. An "entity capability" typically has a business objective rather than a technical objective. A "logical work role" is a collection of entity capabilities that are associated with a relevant set of knowledge, skills and abilities. For example, a logical work role may be associated with to a set of related tasks that may be performed a category of employees of an entity.

An "access control rule" is a rule that is implemented by a resource access manager to control access to its computing resources. An access control rule can be: (i) basic access rights such as "open" or "close" applied to a file or a database or "start" or "stop" applied to a process or task; (ii) more complex logical that takes context and user attributes into consideration and (iii) elevated privilege access rules that are used by a resource access manager to determine the computing resources associated with an elevated privilege and the actions that can be performed on those computing resources by a user requesting access. Root access is an example of an elevated privilege.

A "permission" is a set of access control rules that relate to a particular computing resource. A permission typically has a single permission name and a description of the permission (e.g., a description of the access rights provided by the permission). An "entitlement" links a permission (or access control rule) either directly to a user account or indirectly to a user account via its membership in a user group. In effect, an entitlement provides a user with use of a particular computing resource.

A "user" is a role assumed by an actor when the actor performs actions involving computing resources. Humans (e.g., employees of an entity) and applications are types of actors. Each user may be linked directly or indirectly via a user group to a user account. A "user account" is how: (i) a resource manager accounts for the use of its computing resources and (ii) a resource access manager controls access to the computing resources under its control. A "user group" is a named set of user accounts and other user groups, which may be created for improving the efficiency of how entitlements are administered. Typically, when a user group receives a permission, all of the user accounts that are members of a user group receive the permission. A user group may be a member of another user group. An "inheritance rule" defines whether a child user group inherits the permissions from a parent group, a grandparent group, a great-grandparent group and the like.

An information system typically includes many different resource access managers that can create and manage entitlements for users to access computing resources of the information system. Due to the many different resource access managers within an information system, it is difficult organize and control user entitlements. It is also difficult to maintain consistency and resolve inconsistencies with respect to user entitlements maintained by different resource access managers.

In some instances, an information system may employ one or more central resource access managers. Nevertheless, discrepancies may exist between entitlements maintained by a central resource access manager and entitlements maintained by a resource access manager associated with a particular computing resource. For example, an administrative user of a local resource access manager associated with a particular computing resource may provision an entitlement without using a central resource access manager or otherwise using an entity's standard process for provisioning an entitlement.

To address these problems, the present invention is directed to a system for using a distributed ledger to manage user entitlements to computing resources of an information system. In this regard, data records pertaining to provisioned entitlements are stored on a distributed ledger (e.g., on a blockchain). Typically, different resource access managers of the information system function as nodes of the system. Accordingly, these resource access managers typically store a local copy of the distributed ledger and function to validate new data records being added to the distributed ledger. Validation of new data records related to the provisioning or de-provisioning of entitlements is typically based on ensuring that an approved provisioning process has been employed. By storing validated entitlements on a distributed ledger, such as a blockchain, each resource access manager may be able to store an immutable record of officially approved entitlements.

In addition to storing a local copy of the distributed ledger, each resource access manager typically maintains an entitlement database of provisioned entitlements associated with such resource access manager. Typically, this entitlement database includes the provisioned entitlements that the resource access manager uses to control access to its computing resources and data objects. By way of example, if a user requests access to a particular computing resource, such resource access manager may search such entitlement data to determine whether the user has an entitlement permitting access to the computing resource. Each resource access manager may be configured to compare entitlements in its local entitlement database with entitlements in its local copy of the distributed ledger. If a resource access manager identifies a discrepancy between the entitlements in its local entitlement database and the entitlements in the distributed ledger (e.g., the local entitlement database includes an entitlement not located in the distributed ledger), then the resource access manager may perform an action to remediate the discrepancy (e.g., by updating the local entitlement database to be consistent with the distributed ledger). As such, the distributed ledger may be used to prevent access to computing resources other than in accordance with officially approved entitlements.

Figure 1:
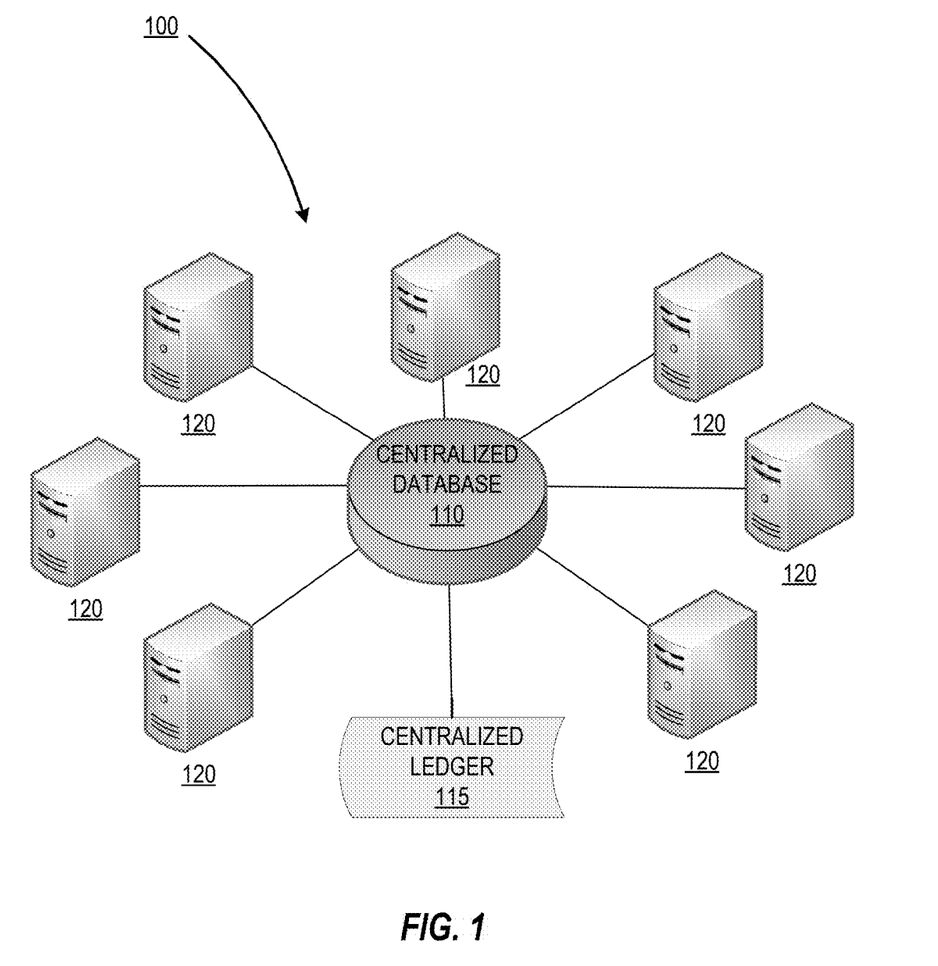
FIG. 1 depicts a centralized database system.

FIG. 1 is a symbol diagram illustrating a centralized database system 100 that may include a centralized database 110 that hosts a centralized ledger 115 or other centralized data. The centralized database 110 may be in operative communication over a network with one or more client systems 120 and is configured to allow the client systems 120 to access and interact with the data stored in the centralized ledger 115. The centralized database 110 may be operated by a central resource access manager and contain information regarding provisioned entitlements. The client systems 120 may be resource access managers associated with particular computing resources. In addition to being in communication with the centralized database 110, each client system 120 may have a local entitlement database. As noted above, it is difficult to maintain consistency between the local entitlement databases and the centralized database 110.

However, in one aspect of the present invention a distributed ledger may be used to maintain information regarding user entitlements of an information system. "Distributed ledger" or "distributed electronic ledger" as used herein may refer to a structured list of data records which is decentralized and distributed amongst a plurality of computing systems and devices.

Figure 2:
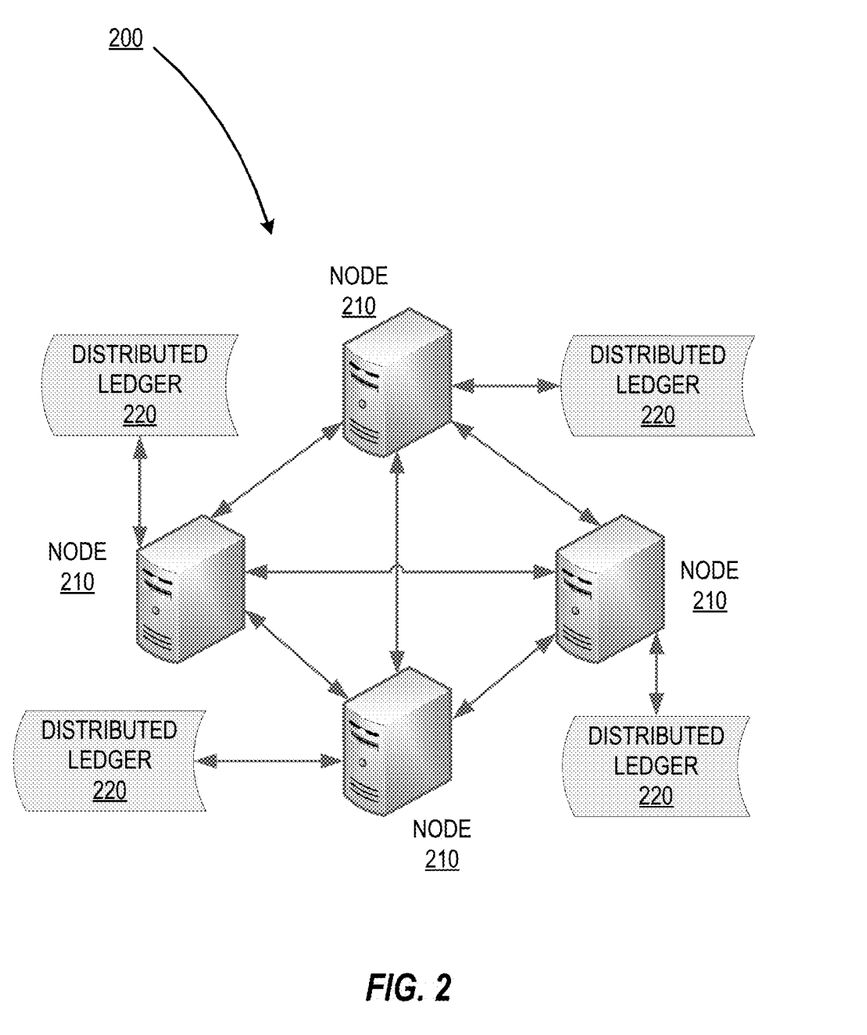
FIG. 2 depicts a distributed electronic ledger system in accordance with an exemplary embodiment of the present invention.

FIG. 2 is a symbol diagram illustrating a distributed electronic ledger system 200 including a distributed ledger 220 stored in a decentralized manner across a plurality of nodes 210, in accordance with some embodiments of the present invention. The distributed ledger 220 may be a blockchain. Each node 210 may be a computing device, which may be in operative communication with the other nodes 210 over a network. Each node may be a resource access manager of an information system. Each node 210 may host a complete or partial copy of the distributed ledger 220.

When additional data records are proposed to be added to the distributed ledger 220, one or more (e.g., each) of the nodes 210 typically validate the proposed additional data records (e.g., via a consensus algorithm) to thereby determine whether the proposed data record should be added to the distributed ledger 220. Typically, once the proposed data record has been validated (e.g., through the consensus algorithm), the proposed data record is added to each copy of the distributed ledger 220 across all of the nodes 210.

Various types of consensus algorithms to ensure the integrity of the data within the distributed ledger may be employed. In some embodiments, validation of data records is part of the utilized consensus algorithm. In other embodiments validation of data records is independent of the consensus algorithm. A non-exhaustive description of exemplary consensus algorithms follows.

In some embodiments, the consensus algorithm may be a "proof of work" ("PoW") algorithm, in which the nodes perform a series of calculations to solve a cryptographic puzzle. For instance, in order to validate a pending data record, the nodes may be required to calculate a hash via a hash algorithm (e.g., SHA256) that satisfies certain conditions set by the system. Calculating a hash in this way may be referred to herein as "mining," and thus nodes performing the mining may be referred to as "miners" or "miner nodes." The distributed ledger system may, for example, require the value of the hash to be under a specific threshold. In such embodiments, the nodes may combine a "base string" (i.e., a combination of various types of metadata within a block header, e.g., root hashes, hashes of previous blocks, timestamps, etc.) with a "nonce" (e.g., a whole number value) to be input into the PoW algorithm to produce a hash. In an exemplary embodiment, the nonce may initially be set to 0 when calculating a hash value using the PoW algorithm. The nonce may then be incremented by a value of 1 and used to calculate a new hash value as necessary until a node is able to determine a nonce value that results in a hash value under a specified threshold (e.g., a requirement that the resulting hash begins with a specified number of zeros). The first node to identify a valid nonce may broadcast the solution (in this example, the nonce value) to the other nodes of the distributed ledger for validation. Once the other nodes have validated the "winning" node's solution, the pending data record may be appended to the last block in the distributed ledger. In some cases, a divergence in distributed ledger copies may occur if multiple nodes calculate a valid solution in a short timeframe. In such cases, the nodes using the PoW algorithm accept the longest chain of blocks (i.e., the chain with the greatest proof of work) as the "true" version of the distributed ledger. Subsequently, all nodes having a divergent version of the distributed ledger may reconcile their copies of the distributed ledger to match the true version as determined by the consensus algorithm.

In other embodiments, the consensus algorithm may be a "proof of stake" ("PoS") algorithm, in which the validation of pending data records depends on a user's "stake" within the distributed ledger. For example, the user's "stake" may depend on the user's stake in a digital currency or point system (e.g., a cryptocurrency, reputation point system, etc.) within the distributed ledger. The next block in the distributed ledger may then be decided by the pending data record that collects the greatest number of votes. A greater stake (e.g., in a given digital currency or point system) results in a greater number of votes that the user may allocate to particular pending data records, which in turn increases the chance for a particular user to create blocks in the distributed ledger system.

In yet other embodiments, the consensus algorithm may be a "practical byzantine fault tolerance" ("PBFT") algorithm, in which each node validates pending data records by using a stored internal state within the node. In particular, a user or node may submit a request to post a pending data record to the distributed ledger. Each of the nodes in the distributed ledger may then run the PBFT algorithm using the pending data record and each node's internal state to come to a conclusion about the pending data record's validity. Upon reaching said conclusion, each node may submit a vote (e.g., "yes" or "no") to the other nodes in the distributed ledger. A consensus is reached amongst the nodes by taking into account the total number of votes submitted by the nodes. Subsequently, once a threshold number of nodes have voted "yes," the pending data record is treated as "valid" and is thereafter appended to the distributed ledger across all of the nodes.

In some embodiments, the distributed ledger 220 allows data records to be appended but does not allow for direct modification of existing data records or any of the other data or metadata existing within the distributed ledger (e.g., blocks in a blockchain). In other embodiments, the distributed ledger 220 allows data records to be directly modified, but maintains a history of previous data record versions and the modifications that were made. Accordingly, the distributed ledger 220 may include all of the data records written to it since its creation. If a particular node 210 were to become unavailable (e.g., due to being offline, hardware failures, security breaches, and the like), the remaining nodes 210 will remain available to host a verified copy of the distributed ledger 220. Furthermore, if data records within the distributed ledger 220 hosted on a particular node 210 were to be deleted, modified, or otherwise compromised, the remaining nodes 210 may serve as references to determine the true version of the distributed ledger 220. In some embodiments, a compromised node 210 may be taken offline such that the corrupted ledger is inaccessible. In other embodiments, the compromised node 210 may automatically correct its copy of the distributed ledger 220 based on the distributed ledger 220 stored on the remaining nodes 210 via a consensus algorithm.

In some embodiments, the distributed ledger may be either unpermissioned or permissioned, and/or either public or private. A "public" distributed ledger may refer to a distributed ledger that is accessible to any member of the public, whereas a "private" distributed ledger may refer to a distributed ledger that is accessible only to users who meet a certain criteria (e.g., limited to employees of a particular entity). A "permissioned" distributed ledger may refer to a distributed ledger for which an access control mechanism is implemented such that only known, authorized users may take certain actions within the distributed ledger (e.g., contribute to consensus and/or validation), whereas an "unpermissioned" distributed ledger may refer to a distributed ledger without an access control mechanism. Accordingly, the distributed ledger may be an unpermissioned and public ledger, an unpermissioned and private ledger, a permissioned and public ledger, or a permissioned and private ledger. In typical embodiments, the distributed ledger is a private, permissioned distributed ledger.

Figure 3:
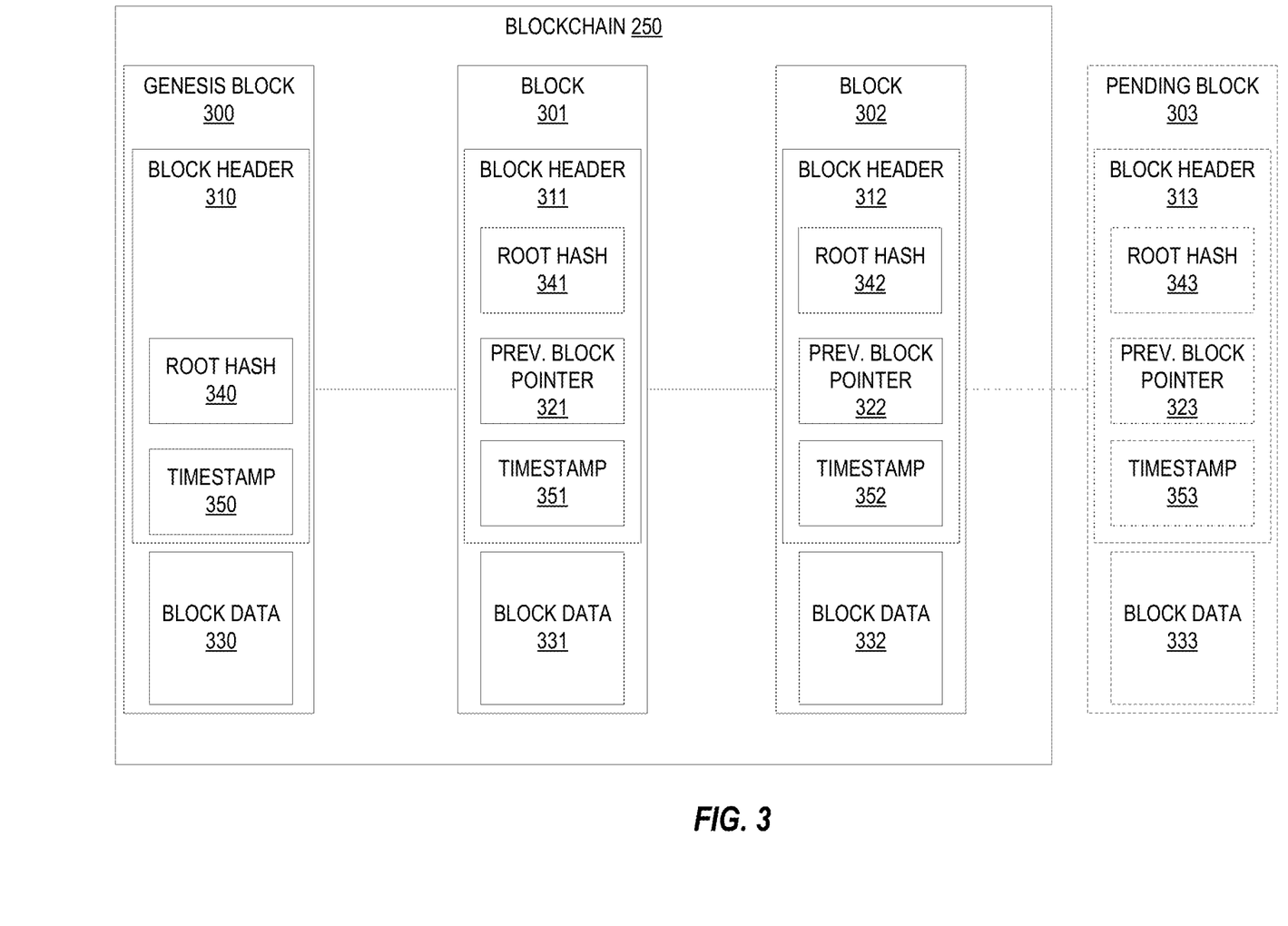
FIG. 3 depicts a blockchain in accordance with an exemplary embodiment of the present invention.

As noted herein, a distributed ledger may take the form of a blockchain. In this regard, FIG. 3 is a block diagram illustrating data structures of a blockchain 250 in detail, in accordance with some embodiments. In particular, FIG. 3 depicts a plurality of blocks 300, 301, and 302 contained in a blockchain 250, in addition to a proposed block 303 to be appended to the last block 302 in the blockchain. The blockchain 250 may include a genesis block 300 that serves as the first block in the blockchain. The genesis block 300, like all other blocks within the blockchain 250, include a block header 310 and block data 330. Each block data 330 within a block 300 may contain a wide range of different types of data records. For instance, in some embodiments, the block data 330 may include information related to the provisioning and de-provisioning of user entitlements. In this regard, the block data 330 may specify the permissions one or more users have to access certain computing resources. The block data 330 may also include a digital signature of a particular user or system that has approved the provisioning or de-provisioning of such user entitlements. In some embodiments, the block data 330 may a link to and/or has value of data contained in a database that exists outside the blockchain.

The block header 310 may include various types of metadata regarding the block data 330. In some embodiments, the block header 310 may include a root hash 340, which is a hash derived from the block data 330. In some embodiments, the root hash 340 may be a Merkle root hash, wherein the root hash 340 is calculated via a hash algorithm based on a combination of the hashes of each transaction within the block data 330. In this way, any changes to the data within the block data 330 will result in a change in the root hash. The block header 310 may further include a timestamp 350 that indicates the time at which the block was written to the blockchain 250. In some embodiments, the timestamp may be a Unix timestamp. In some embodiments, particularly in blockchains utilizing a PoW consensus algorithm, the block header 310 may include a nonce value and a difficulty value. The nonce value may be a whole number value that causes the hash of the block header 310 to satisfy the difficulty level of the cryptographic puzzle as defined by the difficulty value. For instance, the consensus algorithm may require that the resulting hash of the block header 310 metadata falls below a certain value threshold (e.g., the hash must start with a certain number of zeroes, as defined by the difficulty value).

A subsequent block 301 may be appended to the genesis block 300 to serve as the next block in the blockchain. Like all other blocks, the subsequent block 301 includes a block header 311 and block data 331. Similarly, the block header 311 may include a root hash 341 of the data within the block data 331 and a timestamp 351. The block header 311 may further include a previous block pointer 321, which may be a hash calculated by combining the hashes of the metadata (e.g., the root hash 340, timestamp 350, and the like) within the block header 310 of the genesis block 300. The block pointer 321 may be used to identify the previous block (i.e., the genesis block 300) in the blockchain 250. Of course, other types of previous block pointers and other methods of generating and storing a hash of a previous block could be used in a subsequent block in other types of distributed ledger implementations.

A subsequent block 302 may be appended to the block 301, where the subsequent block 302 also includes a block header 312 and block data 332. The block header 312 may also include a previous block pointer 322 that points to the previous block 301, where the previous block pointer 322 may be a hash value derived by combining the metadata within the block header 311 (including the previous block pointer 321) into a hash algorithm. The block pointer 322 may identify the previous block 301 in the blockchain 250.

In this way, the values of each previous block pointer 321, 322 within the blockchain are dependent on the hashes of the block headers of all of the previous blocks in the chain; if the block data within any of the blocks is altered, the block header for the altered block as well as all sub-sequent blocks will result in different hash values (i.e., the hash in the block header may not match the hash of the values within the block data), which may cause subsequent validation checks to fail. Even if an unauthorized user were to change the block header hash to reflect the altered block data, this would in turn change the hash values of the previous block pointers of the next block in the sequence. In other words, an unauthorized user who wishes to alter a data record within a particular block must also alter the hashes of all of the subsequent blocks in the chain in order for the altered copy of the blockchain to pass the validation checks imposed by the consensus algorithm. Thus, the computational impracticability of altering data records in a block-chain in turn greatly reduces the likelihood of improper alteration of data records.

A pending block 303 or "proposed block" may be submitted for addition to the blockchain. The pending block 303 may include a block header 313, which may include a root hash 343, a previous block pointer 323 that points to the block 302, a timestamp 353, and block data 333. Once a pending block 303 is submitted to the system, the nodes within the system may validate the pending block 303 via a consensus algorithm. The consensus algorithm may be, for instance, a proof of work mechanism, in which a node determines a nonce value that, when combined with a hash of the block header 312 of the last block in the blockchain, produces a hash value that falls under a specified threshold value. For instance, the PoW algorithm may require that said hash value begins with a certain number of zeroes. Once said nonce value is determined by one of the nodes in the blockchain, the node may post the "solution" to the other nodes in the blockchain. Once the solution is validated by the other nodes, the hash of the block header 312 is included in the block header 313 of the pending block 303 as the previous block pointer 323. The block header 313 may further include the root hash 343 of the block data 333 which may be calculated based on the winning solution. The pending block 303 is subsequently considered to be appended to the previous block 302 and becomes a part of the blockchain 250. A timestamp 353 may also be added to signify the time at which the pending block 303 is added to the blockchain 250. In other embodiments, the consensus algorithm may be based on a total number of votes submitted by the nodes of the blockchain 250 (e.g., a PBFT consensus algorithm). Once a threshold number of votes to validate the pending block 303 has been reached, the pending block 303 may be appended to the blockchain 250. In such embodiments, nonce values and difficulty values may be absent from the block headers.

Figure 4:
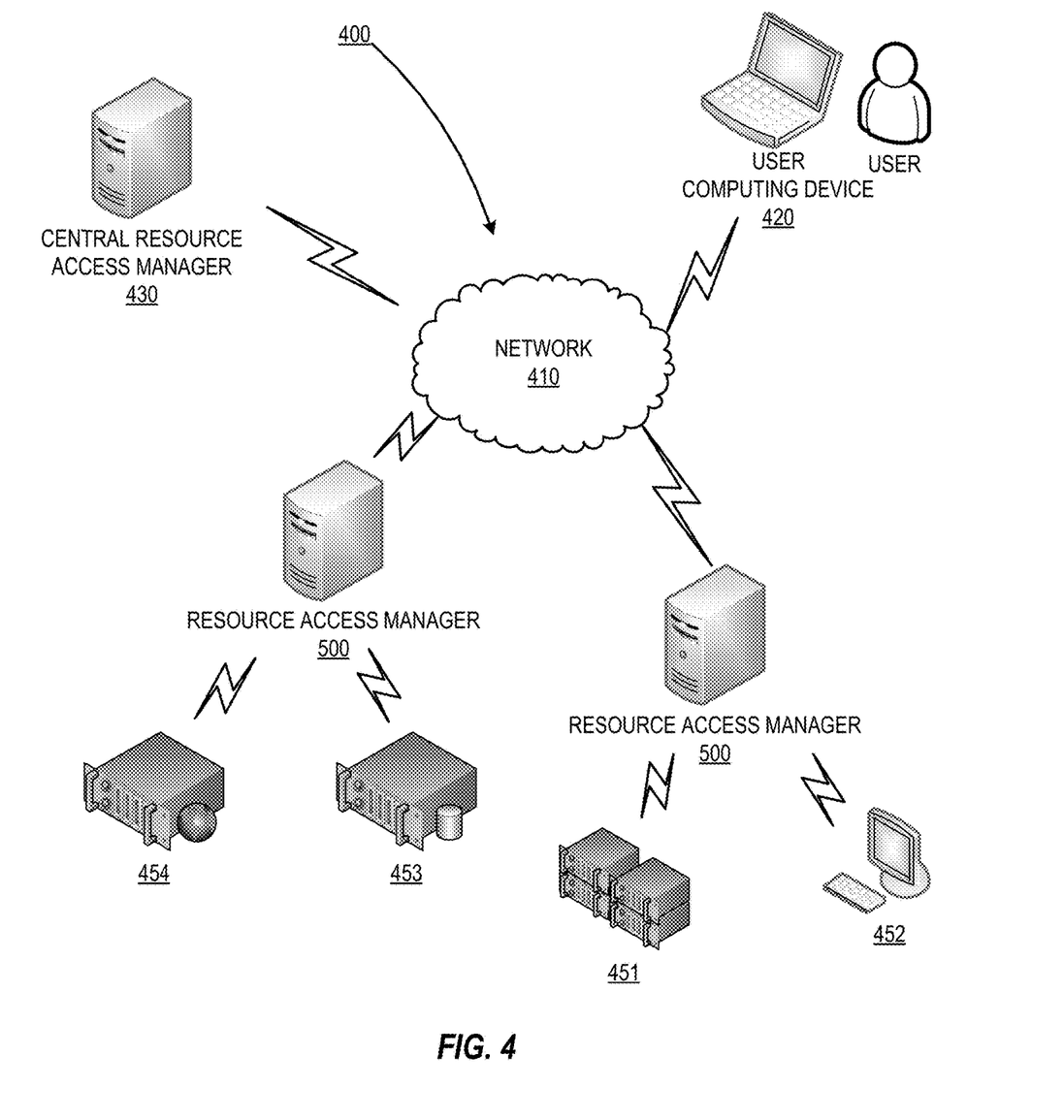
FIG. 4 depicts an operating environment in accordance with an exemplary embodiment of the present invention.

FIG. 4 depicts an operating environment 400 according to one embodiment of the present invention. The operating environment 400 may be an information system owned and/or operated by an entity. The information system is typically a computer-based information system. Accordingly, the information system typically includes a plurality of devices, such as servers 451 and 454-454 and a workstation 452, as well as other computer and technology based resources (e.g., devices, networks, and software applications). The devices within the information system may be configured to operate one or more applications. The information system also typically includes one or more resource access managers 500 that control access to the computing resources of the information system. One or more of the resource access managers 500 (as well as other devices of the information system) may function as nodes of the distributed electronic ledger for storing entitlement data records. The devices within the information system are typically configured to communicate with one another, other devices operated by the entity, and devices operated by third parties (e.g., customers), via a network 410. The network 410 may be any type of network, such as the Internet, wide area network, local area network, Bluetooth® network, near field network, and/or any other form of contact or contactless network. The information system may include all devices, applications, and networks operated by the entity or may include a subset of such devices, applications, and networks.

In some embodiments, the information system may include a central resource access managers 430. The central access manager 430 may be a vertically integrated access control system as described in U.S. patent application Ser. Nos. 15/895,720 and 15/895,763 (each filed on Feb. 13, 2018), each of which is hereby incorporated by reference in its entirety.

The resource access managers 500 and central resource access manager 430 may be in communication with one or more users, each having a user computing device 420, such as a PC, laptop, mobile phone, tablet, television, mobile device, wearable device, or the like (e.g., via the network 410). In some embodiments, the user computing devices 420 may be part of the information system. Such users may also have access to one or more of the computing resources (e.g., applications) of the information system. The resource access managers 500 and/or central resource access manager 430 of the information system may be configured to control such users' access to the computing resources of the information system. In some embodiments, one or more users may be authorized to provision (and/or de-provision) user entitlements within the information system. Accordingly, a user may use a user computing device 420 to update entitlement data records of the resource access managers 500, central resource access manager 430, and/or distributed ledger.

Figure 5:
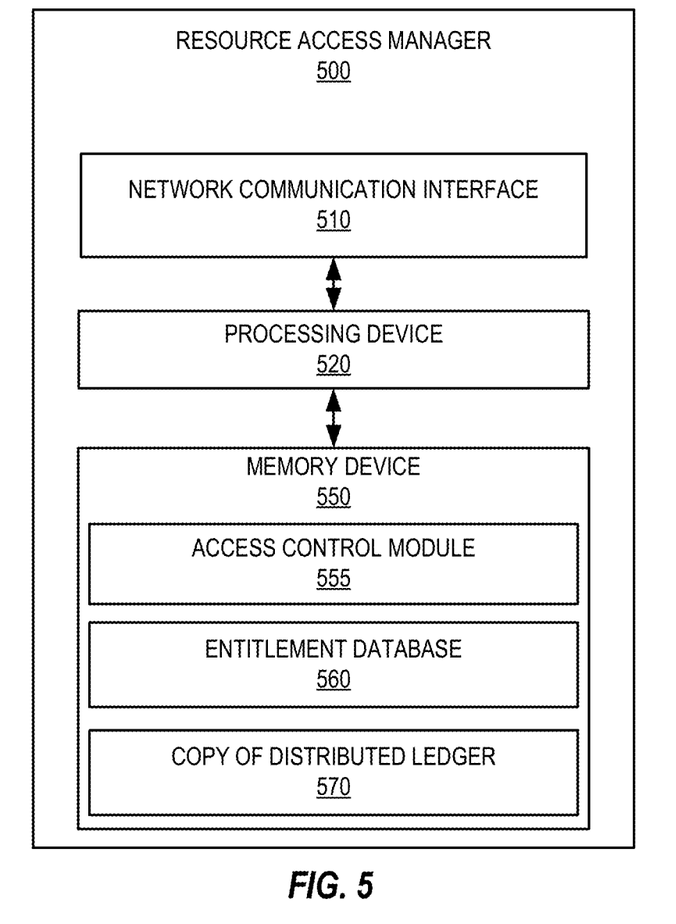
FIG. 5 schematically depicts a resource access manager in accordance with an exemplary embodiment of the present invention.

FIG. 5 depicts a resource access manager 500 in more detail. As depicted in FIG. 5, the resource access manager 500 typically includes various features such as a network communication interface 510, a processing device 520, and a memory device 550. The network communication interface 510 includes a device that allows the resource access manager 500 to communicate with devices (e.g., the servers 451 and 454-454 and/or workstation 452) and other computing resources within the information system and with the user computing devices 420 (e.g., over the network 410 (shown in FIG. 4)).

As used herein, a "processing device," such as the processing device 520, generally refers to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 550, generally refers to a device or combination of devices that store one or more forms of computer-readable media for storing data and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

As noted, the resource access manager 500 is typically configured to control access to one or more computing resources of the information system (e.g., the servers 451 and 454-454 and/or workstation 452). Moreover, the resource access manager 500 may function as a node of the distributed electronic ledger as described herein. Accordingly, the resource access manager 500 typically includes one or more modules stored in the memory device 550, which facilitate access control, the management of entitlements, and operation as a node of the distributed electronic ledger as described herein. As depicted in FIG. 5, the resource access manager 500 typically includes an access control module 555 that is configured to manage entitlements and perform the other functionality described herein. In this regard, the resource access manager 500 typically includes an entitlement database 560. In this entitlement database 560, the resource access manager 500 typically maintains an inventory of entitlement that have been provisioned with respect to the computing resources that the resource access manager 500 controls access to. Entitlement data records in the entitlement database 560 typically link together associated user identities, computing resources, and access control rules (and/or permissions) to define provisioned entitlements. The resource access manager 500 typically relies upon the inventory of provisioned entitlements maintained in the entitlement database 560 in connection with controlling access to computing resources. For example, the resource access manager 500 may only permit a particular user to access a particular computing resource if the entitlement database 560 includes an entitlement data record permitting such access.

As described herein, in addition to each resource access manager 500 maintaining an entitlement database, the information system typically includes at least one distributed ledger (e.g., the distributed ledger 220). Although each resource access manager 500 typically uses its entitlement database in connection with controlling access to computing resources, the distributed ledger typically functions as an "official" record of provisioned entitlements. In some embodiments, the distributed ledger may include entitlement data records associated with all provisioned entitlements of the information systems. In other embodiments, the information system may include multiple distributed ledgers, each distributed ledger include entitlement data records associated with provisioned entitlements for a subset of the computing resources of the information system. For example, the information system may include a first distributed ledger that includes entitlements for computing resources that are used internally (e.g., by employees) by the entity. The information system may also include a second distributed ledger that includes entitlements for computing resources that are used externally (e.g., by customers of the entity). Factors that may be used to determine which computing resources may share a distributed ledger include: the identity of the users, the quantity of provisioned entitlements, the rate at which entitlements are expected to be provisioned/de-provisioned, and the like. For example, a single distributed ledger may maintain entitlement data records for computing resources having overlapping and relatively static users. To minimize problems associated with bloat (e.g., blockchain bloat), separate distributed ledgers may be maintained for computing resources having relatively dynamic populations of users.

The resource access manager 500 typically functions as a node of the distributed ledger (or one of a plurality of distributed ledgers). Accordingly, the resource access manager 500 typically maintains a copy 570 of the distributed ledger. The resource access manager 500 typically functions to validate new entitlement data records. In addition, the resource access manager 500 typically uses the copy 570 of the distributed ledger to identify and then remediate any discrepancies in the entitlement database 560 (e.g., by updating the local entitlement database to be consistent with the distributed ledger). This remediation may resulting in one or more user entitlements being removed, suspended, or modified.

Figure 6:
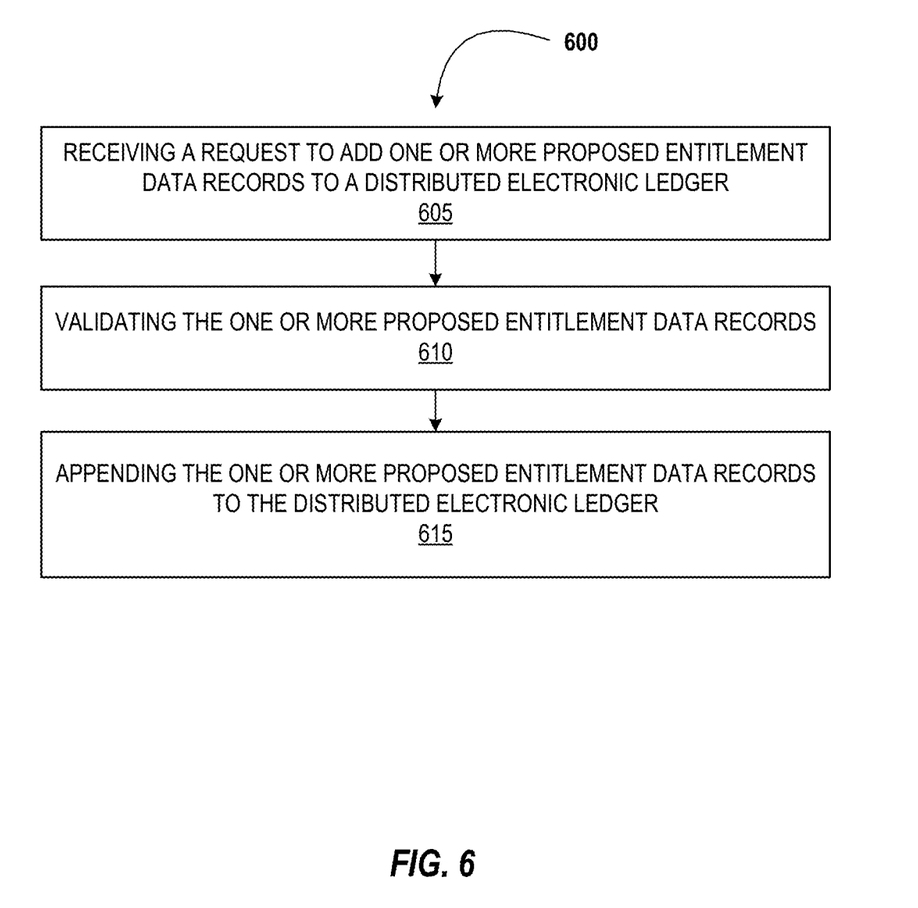
FIG. 6 depicts a method of adding entitlement data records to a distributed electronic ledger in accordance with an exemplary embodiment of the present invention.

FIG. 6 depicts a method 600 of adding entitlement data records to a distributed electronic ledger. The method 600 is described as being performed by the resource access manager 500, but the method 600 may be performed by any node of the distributed ledger.

At block 605, the resource access manager 500 receives a request to add one or more proposed entitlement data records to the distributed electronic ledger. The one or more entitlement data records may relate to provisioning new entitlements and/or to de-provisioning or modifying existing entitlements.

In some embodiments, the data contained in the one or more proposed entitlement data records may be encrypted. In other embodiments, the one or more proposed entitlement data records may include one or more links to data contained in a separate database (i.e., a database that exists outside the distributed ledger).

In further embodiments, the one or more proposed entitlement data records may include one or more hash values. These hash values may be calculated by applying a hash function to data about an entitlement that is contained in a separate database. Thus, instead of containing complete information about a particular entitlement, a proposed entitlement data record may include a hash value that be used to verify the integrity of an entitlement data record that has complete information.

The request typically originates from a user (e.g., administrator) that is authorized to provision/de-provision entitlements. The user may transmit the request to the distributed ledger using a user device (e.g., the user computing device 420). Alternatively, the request may originate from an automated system (e.g., from a central resource access manager 430). In addition to the resource access manager 500 receiving the request, other nodes (e.g., other resource access managers) of the distributed ledger also typically receive the request.

At block 610, the resource access manager 500 validates the one or more proposed entitlement data records. Typically, validation of the proposed data records relates to ensuring that the user or system that proposed such data records is authorized to add such data records to the distributed ledger. That said, it is within the scope of the present invention for other and/or additional validation criteria to be employed.

To facilitate validation, the resource access manager 500 may maintain a list of users and/or systems that are authorized to add entitlement data records to the distributed ledger. Such list of authorized users may be stored within the distributed ledger, or may be separately stored by each node of the distributed ledger. If the resource access manager 500 determines that the user and/or system is authorized, then the resource access manager 500 typically designates the one or more proposed entitlement data records as being valid. On the other hand, if the resource access manager 500 determines that the user and/or system is not authorized, then the resource access manager 500 typically designates the one or more proposed entitlement data records as being invalid. To facilitate validation, the user and/or system proposing the one or more proposed entitlement data records may add a digital signature to such record(s) (e.g., by signing the record(s) with a private key). Thereafter, the resource access manager 500 may determine that such proposing user/system is authorized and validate the authenticity of the digital signature (e.g., by using a public key of such user/system).

In addition to validation of the proposed entitlement data record(s) by the resource access manager 500, other nodes (e.g., other resource access managers) also typically validate the proposed data record(s). Validation of the proposed entitlement data record(s) by different nodes of the distributed ledger may be part of a consensus algorithm. The consensus algorithm typically facilitates an "official" determination as to whether the proposed entitlement data records are valid or invalid. In this regard, if the different nodes of the distributed come to different conclusions regarding validity, the consensus algorithm typically resolves any conflict to make a final determination as to validity. For example, each node may submit a vote regarding validity and, based on these votes, the consensus algorithm may determine validity.

At block 615, the one or more proposed entitlement data records are appended to the distributed ledger. In this regard, the resource access manager 500 typically appends the one or more proposed entitlement data records to its copy 570 of the distributed ledger. The other nodes also typically append the one or more proposed entitlement data records to their respective copies of the distributed ledger.

In some embodiments, the one or more proposed entitlement data records are only appended to the distributed ledger, if the one or more proposed entitlement data records are determined to be valid. Alternatively, the one or more proposed entitlement data records may be appended to the distributed ledger regardless of validity; however, based on the determined validity, an indicator of validity or invalidity may also be appended to the distributed ledger. If "invalid" data records are appended to the distributed ledger, such invalid data records may be used for historic tracking or auditing purposes, but are typically ignored for the purpose of verifying information in the entitlement database 560 as described in more detail herein.

The steps of method 600 may be repeated each time one or more entitlement data records are proposed to be added to the distributed ledger.

Figure 7:
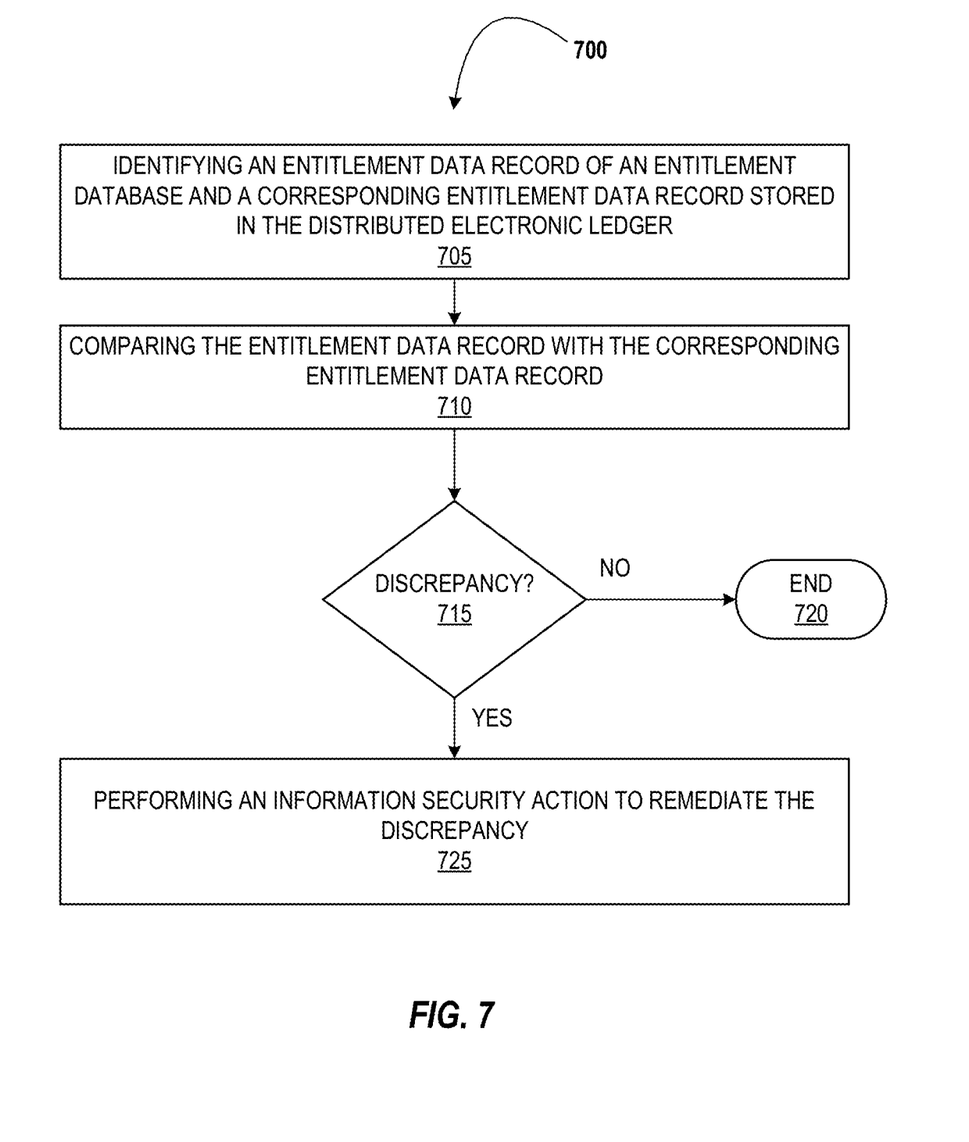
FIG. 7 depicts a method of verifying an entitlement data record in accordance with an exemplary embodiment of the present invention.

FIG. 7 depicts a method 700 of verifying an entitlement data record in an entitlement database of the resource access manager 500. The method 700 is described as being performed by the resource access manager 500, but the method 600 may be performed by any node of the distributed ledger.

At block 705, the resource access manager 500 identifies an entitlement data record of the entitlement database 560. This entitlement data record typically relates to the provisioning or de-provisioning of one or more user entitlements. In addition, the resource access manager 500 identifies a corresponding entitlement data record of the distributed ledger (e.g., in the copy 570 of the distributed ledger stored by the resource access manager 500). The corresponding entitlement data record of the distributed ledger typically relates to the same (or similar) users and/or computing resources as those in the entitlement data record of the entitlement database 560. By way of example, the entitlement data record of the entitlement database 560 and the corresponding entitlement data record of the distributed ledger may both relate to user "XYZ." The entitlement data records of the distributed may include metadata (e.g., metadata indicative of applicable user(s)) that allow for ready identification of the entitlement data records that correspond to data records of the entitlement database.

At block 710, the resource access manager 500 typically compares the entitlement data record of the entitlement database 560 with the corresponding entitlement data record of the distributed ledger. If the corresponding entitlement data record of the distributed ledger includes encrypted information, this information is typically decrypted before this comparison. Thereafter, the decrypted information may be compared to information contained in the entitlement data record of the entitlement database 560.

In some embodiments, instead of including complete information about one or more entitlements, an entitlement data record of the distributed ledger may include a hash value of entitlement data that was computed using a hash function. Accordingly, before comparing the entitlement data record of the entitlement database 560 with the corresponding entitlement data record of the distributed ledger, the resource access manager 500 may use the hash function to calculate a hash value of information contained in the entitlement data record of the entitlement database 560. The resource access manager 500 may then compare the hash value computed from entitlement data record of the entitlement database 560 with the hash value contained in the corresponding entitlement data record of the distributed ledger to determine if a discrepancy exists.

At block 715, based on comparing the entitlement data record of the entitlement database 560 with the corresponding entitlement data record of the distributed ledger, the resource access manager 500 determines if a discrepancy exists.

If no discrepancy exists (e.g., if a hash value computed from entitlement data record of the entitlement database 560 matches a hash value contained in the corresponding entitlement data record of the distributed ledger), then, at block 720, the resource access manager 500 may take no further action and the method 700 ends.

If a discrepancy exists, then, at block 725, the resource access manager 500 typically performs an information security action to remediate the discrepancy. In some embodiments, the resource access manager 500 may update the entitlement database 560 to eliminate the discrepancy. Correct entitlement information may be obtained directly from the distributed ledger or from a central resource access manager. By way of example, if the resource access manager 500 determines that an entitlement data record of the entitlement database 560 provides more access rights to a particular user than the access rights specified in the corresponding entitlement data record, the resource access manager 500 may modify such entitlement data record of the entitlement database 560 so that such user's access rights match those specified in the distributed ledger. If the resource access manager 500 determines that the distributed ledger does not include any access rights for a particular user to a particular computing resource, the resource access manager 500 may remove any entitlements to such computing resource that are contained in the entitlement database 560. In some embodiments, if the resource access manager 500 identifies a discrepancy with respect to a particular user, the resource access manager 500 may suspend such user's entitlements and then notify a qualified individual (e.g., an administrator) of such discrepancy.

The steps of this method 700 may be performed periodically for the entitlement data records contained in the entitlement database 560. Additionally and/or alternatively, the steps of this method 700 may be performed in response to a triggering event. A triggering event may be an administrator requesting verification of entitlement data record. A triggering event may be a user requesting access to a computing resource.

In some embodiments, the resource access manager 500 may be configured to perform one or more of the steps described herein (e.g., those steps described with respect to methods 600 and 700) in real-time or near real-time, thereby facilitating prompt validation, as well as remediation of any discrepancies. In other words, these steps may occur without any significant delay between such steps (e.g., within a few seconds or minutes).

As evident from the preceding description, the system described herein represents an improvement in technology in that the system is able to use a distributed ledger to manage user entitlements to computing resources of an information system. By maintaining entitlement data records in a distributed ledger, such as a blockchain, an immutable record of provisioned and de-provisioned entitlements may be maintained. Moreover, validation as described herein may help to ensure that only authorized users/systems can add data records to the distributed ledger. Accordingly it is possible to maintain an "official" record of provisioned entitlements that is less likely than a conventional database to be subject to unauthorized modification. This "official" record of provisioned entitlements may then be used to identify and then remediate any discrepancies in the entitlement databases maintained by resource access managers. Moreover, by maintaining entitlement data records using blockchain or other distributed ledger technology, it is possible to maintain a historic record of user entitlements and any changes may thereto, may be facilitate subsequent investigations or audits. Because a distributed ledger structure is used instead of a centralized ledger, the distributed ledger remains available to each resource access manager even if other nodes of the distributed ledger fail or become unavailable. Finally, in some embodiments, the information contained in the distributed ledger may be encrypted or may be a hash value (e.g., a hash of information contained in a central database). Accordingly, even though copies of the distributed ledger may be stored on multiple nodes, it is possible to maintain confidentiality of information stored on the distributed ledger.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An access control system, comprising:
one or more computer processors;
a memory, wherein the memory comprises (1) an entitlement database of a resource access manager and (2) a local copy of a distributed electronic ledger;
a network communication device; and
an access control module stored in the memory, executable by the one or more computer processors, and configured to perform the steps of:
receiving a request to add one or more entitlement data records to the distributed electronic ledger, the distributed electronic ledger comprising a plurality of other entitlement data records, wherein the one or more entitlement data records include one or more permissions for one or more users within an information system to access one or more computing resources of the information system, wherein the one or more entitlement data records comprise one or more digital signatures;
validating the one or more entitlement data records comprises validating the one or more digital signatures;
appending the one or more entitlement data records to the distributed electronic ledger; and
verifying a first entitlement data record stored in the entitlement database by comparing the first entitlement data record with a first corresponding entitlement data record stored in the local copy of the distributed electronic ledger, wherein the first entitlement data record and the first corresponding entitlement data record are both associated with a first user, wherein the first corresponding entitlement data record comprises a first hash value computed by applying a hash function to data about an entitlement of the first user, wherein verifying the first entitlement data record comprises:
calculating, using the hash function, a second hash value based on the first entitlement data record;
comparing the first hash value and the second hash value;
identifying a discrepancy between the first hash value and the second hash value; and
in response to identifying the discrepancy between the first hash value and the second hash value, performing an information security action to remediate the discrepancy, wherein the information security action comprises suspending, modifying, or removing one or more entitlements of the first user.

2. The access control system according to claim 1, wherein verifying the first entitlement data record comprises:
identifying a discrepancy between the first entitlement data record and the first corresponding entitlement data record; and
in response to identifying the discrepancy between the first entitlement data record and the first corresponding entitlement data record, performing an information security action to remediate the discrepancy.

3. The access control system according to claim 2, wherein the information security action comprises updating the entitlement database to eliminate the discrepancy.

4. The access control system according to claim 1, wherein:
the first corresponding entitlement data record stored in the distributed electronic ledger comprises encrypted data; and
verifying the first entitlement data record comprises:
decrypting the encrypted data; and
comparing the decrypted data with data from the first entitlement data record.

5. The access control system according to claim 1, wherein the one or more entitlement data records are appended to the distributed electronic ledger in response to validating the one or more entitlement data records.

6. The access control system according to claim 1, wherein the distributed electronic ledger is a blockchain.

7. The access control system according to claim 1, wherein:
the one or more entitlement data records are associated with provisioning and/or de-provisioning one or more entitlements; and
the access control system is the resource access manager.

8. A computer program product for managing user entitlements to computing resources, the computer program product comprising a non-transitory computer-readable storage medium having computer-executable instructions for causing a computer processor to perform the steps of:
receiving a request to add one or more entitlement data records to a distributed electronic ledger, the distributed electronic ledger comprising a plurality of other entitlement data records, wherein the one or more entitlement data records include one or more permissions for one or more users within an information system to access one or more computing resources of the information system, wherein the one or more entitlement data records comprise one or more digital signatures;
validating the one or more entitlement data records comprises validating the one or more digital signatures;
appending the one or more entitlement data records to the distributed electronic ledger; and
verifying a first entitlement data record stored in an entitlement database of a resource access manager by comparing the first entitlement data record with a first corresponding entitlement data record stored in a local copy of the distributed electronic ledger, wherein the first entitlement data record and the first corresponding entitlement data record are both associated with a first user, wherein the first corresponding entitlement data record comprises a first hash value computed by applying a hash function to data about an entitlement of the first user, wherein verifying the first entitlement data record comprises:
calculating, using the hash function, a second hash value based on the first entitlement data record;
comparing the first hash value and the second hash value;
identifying a discrepancy between the first hash value and the second hash value; and
in response to identifying the discrepancy between the first hash value and the second hash value, performing an information security action to remediate the discrepancy, wherein the information security action comprises suspending, modifying, or removing one or more entitlements of the first user.

9. The computer program product according to claim 8, wherein verifying the first entitlement data record comprises:
identifying a discrepancy between the first entitlement data record and the first corresponding entitlement data record; and
in response to identifying the discrepancy between the first entitlement data record and the first corresponding entitlement data record, performing an information security action to remediate the discrepancy.

10. The computer program product according to claim 9, wherein the information security action comprises updating the entitlement database to eliminate the discrepancy.

11. The computer program product according to claim 8, wherein:
the first corresponding entitlement data record stored in the distributed electronic ledger comprises encrypted data; and
verifying the first entitlement data record comprises:
decrypting the encrypted data; and
comparing the decrypted data with data from the first entitlement data record.

12. The computer program product according to claim 8, wherein the one or more entitlement data records are appended to the distributed electronic ledger in response to validating the one or more entitlement data records.

13. A method of managing user entitlements to computing resources, comprising:
receiving, via a computer processor, a request to add one or more entitlement data records to a distributed electronic ledger, the distributed electronic ledger comprising a plurality of other entitlement data records, wherein the one or more entitlement data records include one or more permissions for one or more users within an information system to access one or more computing resources of the information system, wherein the one or more entitlement data records comprise one or more digital signatures;
validating, via a computer processor, the one or more entitlement data records comprises validating the one or more digital signatures;
appending, via a computer processor, the one or more entitlement data records to the distributed electronic ledger; and
verifying, via a computer processor, a first entitlement data record stored in an entitlement database of a resource access manager by comparing the first entitlement data record with a first corresponding entitlement data record stored in a local copy of the distributed electronic ledger, wherein the first entitlement data record and the first corresponding entitlement data record are both associated with a first user, wherein the first corresponding entitlement data record comprises a first hash value computed by applying a hash function to data about an entitlement of the first user, wherein verifying the first entitlement data record comprises:
calculating, using the hash function, a second hash value based on the first entitlement data record;
comparing the first hash value and the second hash value;
identifying a discrepancy between the first hash value and the second hash value; and
in response to identifying the discrepancy between the first hash value and the second hash value, performing an information security action to remediate the discrepancy, wherein the information security action comprises suspending, modifying, or removing one or more entitlements of the first user.

\* \* \* \* \*